US009590839B2

(12) United States Patent
Curran et al.

(10) Patent No.: US 9,590,839 B2
(45) Date of Patent: Mar. 7, 2017

(54) CONTROLLING ACCESS TO A SHARED STORAGE SYSTEM

(71) Applicant: International Business Machines Corporation, Armonk, NY (US)

(72) Inventors: Robert J. Curran, Poughkeepsie, NY (US); Carlos F. Fuente, Winchester (GB); Kalyan C. Gunda, Bangalore (IN); Wolfgang Mueller-Friedt, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 13/671,553

(22) Filed: Nov. 7, 2012

(65) Prior Publication Data
US 2013/0311659 A1    Nov. 21, 2013

(30) Foreign Application Priority Data

Nov. 15, 2011    (GB) .................................... 1119660.7

(51) Int. Cl.
| | | |
|---|---|---|
| *G06F 15/173* | (2006.01) | |
| *H04L 12/24* | (2006.01) | |
| *G06F 21/60* | (2013.01) | |
| *H04L 29/06* | (2006.01) | |
| *H04L 29/08* | (2006.01) | |
| *G06F 3/06* | (2006.01) | |

(52) U.S. Cl.
CPC .............. *H04L 41/00* (2013.01); *G06F 3/067* (2013.01); *G06F 3/0622* (2013.01); *G06F 3/0637* (2013.01); *G06F 21/604* (2013.01); *H04L 63/10* (2013.01); *H04L 67/1097* (2013.01)

(58) Field of Classification Search
CPC .. G06F 11/0709; G06F 11/1425; G06F 3/067; G06F 11/0751; G06F 11/2023; G06F 17/30598; H04L 67/1097; H04L 41/00; H04L 63/10; H04L 69/40; H04L 43/10
USPC .................. 709/223, 225, 226, 229; 707/790
See application file for complete search history.

(56) References Cited

U.S. PATENT DOCUMENTS 6,205,510 B1 *   3/2001   Mendel ............................. 711/1
6,279,032 B1     8/2001   Short et al.
(Continued)

OTHER PUBLICATIONS

Bright, J., "A Scalable Architecture for Clustered Network Attached Storage", pp. 1-11.
(Continued)

*Primary Examiner* — Dustin Nguyen
*Assistant Examiner* — Hao Nguyen
(74) *Attorney, Agent, or Firm* — David W. Victor; Konrad, Raynes, Davda and Victor LLP

(57) ABSTRACT

Provided are a system, method, and computer program product for controlling access to a shared storage system in communication with at least one cluster of host nodes. Cluster membership metadata is stored in a storage independent from the shared storage for at least one cluster. The cluster membership metadata is updated in response to an inclusion or exclusion request from a requesting host node comprising one of the host nodes identifying at least one other host node to include or exclude from a cluster. Access to at least one storage volume in the shared storage system is managed in response to the updating of the cluster membership metadata for the inclusion or exclusion request.

21 Claims, 5 Drawing Sheets

(56) References Cited

U.S. PATENT DOCUMENTS

| | | | |
|---|---|---|---|
| 6,449,641 B1 | 9/2002 | Moiin et al. | |
| 6,738,872 B2 | 5/2004 | Van Huben et al. | |
| 7,516,285 B1 | 4/2009 | Haynes et al. | |
| 7,590,737 B1 | 9/2009 | Chen et al. | |
| 8,707,082 B1 * | 4/2014 | Chen | G06F 11/0793 707/790 |
| 2002/0016845 A1 * | 2/2002 | Palmer | H04L 67/10 709/229 |
| 2004/0221149 A1 * | 11/2004 | Rao et al. | 713/2 |
| 2006/0015537 A1 | 1/2006 | Marks | |
| 2007/0022138 A1 * | 1/2007 | Erasani et al. | 707/104.1 |
| 2007/0022314 A1 | 1/2007 | Erasani et al. | |
| 2008/0209136 A1 | 8/2008 | Qi et al. | |
| 2011/0179231 A1 * | 7/2011 | Roush | G06F 3/0622 711/152 |
| 2012/0297134 A1 * | 11/2012 | Parthasarathy | G06F 3/061 711/114 |
| 2014/0245026 A1 * | 8/2014 | Bates | G06F 3/065 713/190 |

OTHER PUBLICATIONS

"Configuring and Managing a Red Hat Cluster", Red Hat Cluster for Red Hat Enterprise Linux 5, dated 2007, pp. 1-86.
International Search Report, dated Mar. 5, 2012, for Application No. GB1119660.7, Reference No. GB920110122GB1, Total 3 pages.

* cited by examiner

CONTROLLING ACCESS TO A SHARED STORAGE SYSTEM

CROSS-REFERENCE TO RELATED FOREIGN APPLICATION

This application is a non-provisional application that claims priority benefits under Title 35, United States Code, Section 119(a)-(d) from United Kingdom Patent Application entitled "CONTROLLING ACCESS TO A SHARED STORAGE SYSTEM", by Robert J. CURRAN, Carlos F. FUENTE, Kalyan C. GUNDA, and Wolfgang MUELLER-FRIEDT, having United Kingdom Patent Application No. GB1119660.7, filed on Nov. 15, 2011, which United Kingdom Patent Application is incorporated herein by reference in its entirety.

BACKGROUND OF THE INVENTION

1. Field of the Invention

The present invention relates to controlling access to a shared storage system.

2. Description of the Related Art

Concerns that commonly arise in clustered environments that relate to controlling access to shared resources are:

1. Establishing which cluster members currently have access to shared resources; and 2. When one cluster member is lost, guaranteeing to the surviving members of the cluster that both:
   (i) The lost member is prevented from having future access to the shared resource without said lost member becoming aware that it needs to interlock with the rest of the cluster; and
   (ii) Ensuring that any use of the shared resource by the lost member is committed or aborted, so that the surviving members can perform recovery without being undermined by stale traffic from the lost member.

Part 2 of the problem (including both sub-parts (i) and (ii) is sometimes known as "fencing".

Managing the cluster membership has a number of solutions. One means might be to record the membership in some location which has adequate availability.

The fencing problem is also addressed by a number of techniques. One solution where the shared resource is a SCSI-3 block device is to use Persistent Reserve (PR). Specifically this provides a 'PREEMPT & ABORT' sub-command that both removes the lost cluster member, thus denying said lost cluster member future access to the said SCSI-3 block device, and further commits or aborts its ongoing I/O so that the shared resource is stable for use by the surviving cluster members.

In a system such as V7000 Unified, there are many such logical units. There are in principle two ways of structuring the solution using SCSI PR:

Maintain a cluster membership list on all LUs, and use PR including PREEMPT&ABORT on all volumes.

Use PR and PREEMPT&ABORT on just one volume.

SUMMARY

Provided are a system, method, and computer program product for controlling access to a shared storage system in communication with at least one cluster of host nodes. Cluster membership metadata is stored in a storage independent from the shared storage for at least one cluster. The cluster membership metadata is updated in response to an inclusion or exclusion request from a requesting host node comprising one of the host nodes identifying at least one other host node to include or exclude from a cluster. Access to at least one storage volume in the shared storage system is managed in response to the updating of the cluster membership metadata for the inclusion or exclusion request.

DETAILED DESCRIPTION

Figure 1:
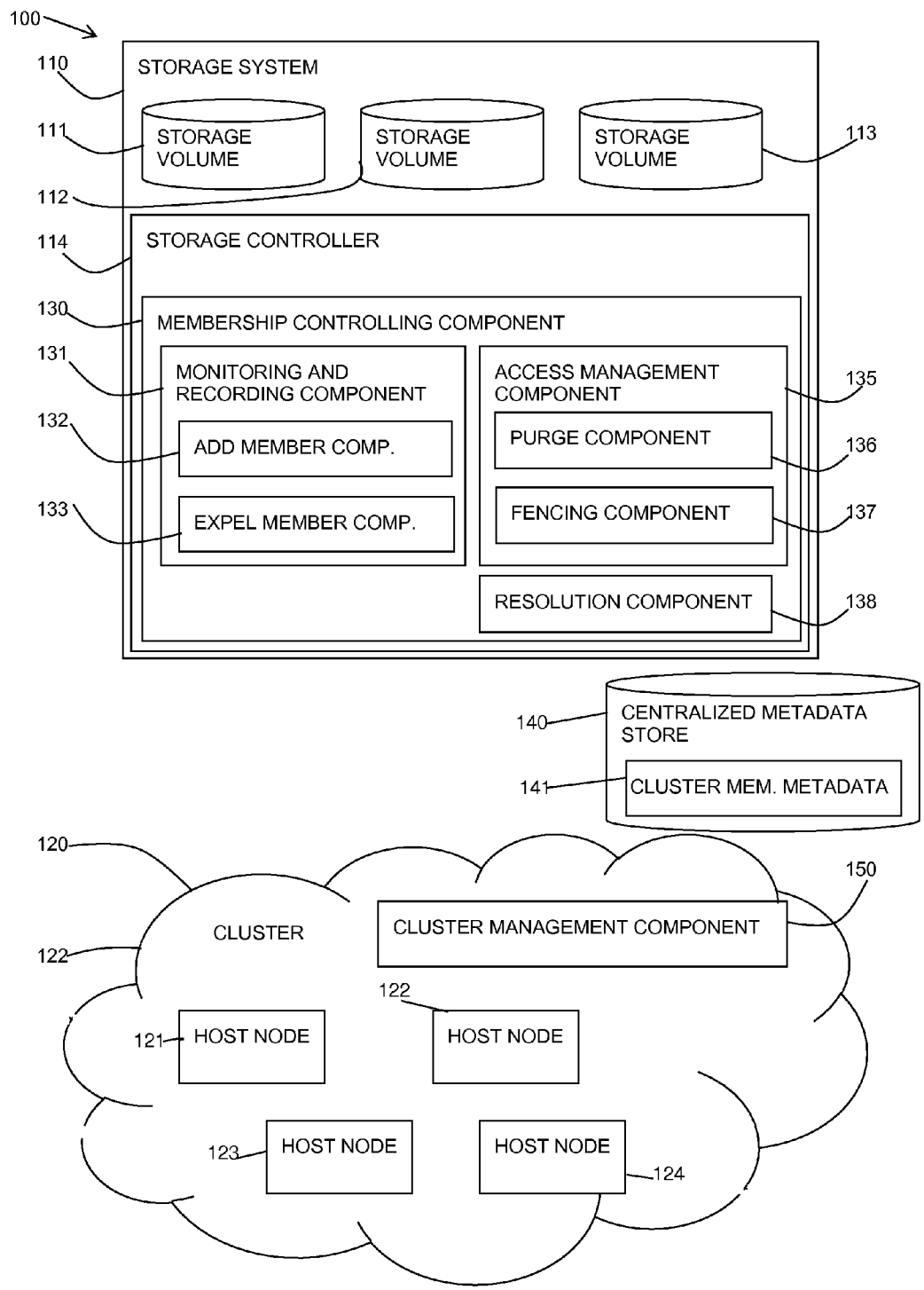
FIG. 1 is a block diagram of an embodiment of a system.

The Persistent Reserve solution, though functionally sufficient, is not optimal because it operates at the scope of a logical unit (also referred to as a block device or volume). In the V7000 Unified system, the method of maintaining a cluster membership list on all LUs, and use PR including PREEMPT&ABORT on all volumes is difficult because maintaining a membership list on all volumes is an expensive and complex operation, in particular in the face of interruptions to the execution of commands caused by hardware failures. Also in a system comprising multiple logical units (LUs), the total system design may demand continued operation even in the face of failure of a subset of those LUs. The use of PR and PREEMPT&ABORT on just one volume is inadequate since it does not address the fencing issue on all the volumes. It also creates an anomaly in the system design since it leaves just one volume with special significance.

There is advantage in providing a solution that can address the 'fencing' problem without relying on per-LU processing, and without assigning special significance to any single volume.

A further problem that arises in these clustered systems is the decision of establishing a tie-break in the event of a loss of communications between cluster members. The simplest example of this is a two-node cluster where communications is lost between the two, and this might be due to failure of one node, or loss of the network between the two. The solution for correct operation in such cases is to implement a tie-break. A storage controller is often a convenient place to implement such a tie-break; however, this also suffers from problems that mirror those above:

Performing tie-break across multiple volumes adds to the work during error recovery, and also ties this key step in recovery processing to disk behavior that might be sub-optimal for reasons which are necessary for reasons not relevant to the task of performing the quorum tie-break; and Performing tie-break with a single volume creates an anomaly in the system design.

There is further advantage that can be obtained if the solution can perform a tie-break function for such an environment.

In certain embodiments, there is provided a method for controlling access to a shared storage system wherein the shared storage system is in communication with one or more clusters of host nodes, comprising: storing cluster membership metadata in a centralized storage independent from the shared storage; updating the cluster membership metadata in response to an inclusion or exclusion request from a host node identifying one or more host nodes to include or exclude from a cluster; and managing access to one or more storage volumes in the shared storage system in response to each inclusion or exclusion update to the cluster membership metadata.

In a further embodiment, there is provided a system for controlling access to a shared storage system wherein the shared storage system is in communication with one or more clusters of host nodes, comprising: a processor; a centralized metadata store for storing cluster membership metadata independent from the shared storage; membership controlling component for updating the cluster membership metadata in response to an inclusion or exclusion request from a host node identifying one or more host nodes to include or exclude from a cluster; and an access management component for managing access to one or more storage volumes in the shared storage system in response to each inclusion or exclusion update to the cluster membership metadata.

In a still further embodiment, there is provided a computer program stored on a computer readable medium and loadable into the internal memory of a digital computer, comprising software code portions, when said program is run on a computer, for performing the method embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the described embodiments. However, it will be understood by those skilled in the art that the described embodiments may be practiced without these specific details. In other instances, well-known methods, procedures, and components have not been described in detail so as not to obscure the described embodiments.

Method and system are described in which a function interface (referred to herein as a membership controlling component) is provided for a shared storage system which addresses the membership and fencing issues encountered by a clustered system using multiple logical units on that system.

A membership controlling component is described which records the cluster membership in a single database unrelated to the shared resources that are being accessed. When a cluster member is removed from the membership list, the membership controlling component causes its I/O traffic on all shared resources to be purged, and the fence established so that the removed member is denied future access without interlocking again with the rest of the cluster. The membership controlling component provides for a single invocation to provide the fencing function across all volumes in a coherent way.

Optionally, the membership controlling component can further be used to provide a quorum tie-break function, for environments where that is needed.

Referring to FIG. 1, a block diagram shows a system 100 including a storage system 110 having one or more storage volumes 111-113 and a storage controller 114. A cluster 120 of host nodes 121-124 may be in communication with the storage system 110 via the storage controller 114 and may share the storage volumes 111-113.

The storage system 110 may be a conventional storage controller containing drives or solid state devices as developed by many companies including International Business Machines Corporation, EMC Corporation, Hitachi Data Systems, NetApp, Inc. and others. International Business Machines Corporation's devices include DS8000, Storwize V7000 (trade mark of International Business Machines Corporation), DS3500. The storage system 110 may also include appliance layer devices which implement control layers but rely on storage in an underlying layer such as IBM's SAN Volume Controller, EMC's VPLEX, Netapp Gateway.

The described system 100 includes a membership controlling component 130 for a storage system 110 which provides an interface for the host nodes 121-124 sharing the storage volumes 111-113. The storage controller 114 may normally contain all the key control functions for the storage system 110. The membership controlling component 130 may be inserted in the storage controller 114 to mediate access to the devices.

The membership controlling component 130 may include a monitoring and recording component 131 for monitoring and recording membership of the host nodes 121-124 in a cluster 120. The monitoring and recording component 131 may include an add member component 132, and an expel member component 133.

The monitoring and recording component 131 may monitor inclusion or exclusion request commands from the host nodes 121-124 and record changes to the membership in a centralized metadata store 140. The centralized metadata store 140 may be independent from the storage volumes 111-113 and may store cluster membership metadata 141. The cluster membership metadata 141 may include a list of identifiers or names of host nodes 121-124 currently in a cluster 120 and, for each host node 121-124, a list of host port identifiers (for example, World Wide Port Names (WWPNs) in Fibre Channel storage systems).

The membership controlling component 130 may include an access management component 135 for allowing access or for isolating one or more of said storage volumes 111-113 from one or more of said host nodes 121-124 in response to each inclusion or exclusion update to the cluster membership metadata 141. The access management component 135 may include a purge component 136 for purging I/O traffic of a removed cluster member and a fencing component 137 for establishing a fence for a removed cluster member across all volumes.

A feature of the access management component 135 is that it examines all I/O on ingress to the storage system 110, and based on the host port on which the I/O arrives, combined with the logical unit to which that I/O is addressed, decides whether the host to which that host port is configured is part of the current nodes that are permitted access, or whether conversely that host has been fenced out.

The membership controlling component 130 may also include a resolution component 138 for resolving conflicting requests to update the cluster membership metadata 141. The resolution component 138 may provide a quorum tie-break function. For example, resolution of a conflict may involve taking each request as it is received, and deciding if that request is valid given the previous history.

The cluster 120 of host nodes 121-124 may include a cluster management component 150 which uses the cluster membership metadata 141 as the only means of defining the cluster membership. This allows the set of clustered host nodes 121-124 to use the cluster membership metadata 141 contents and the results of the requests to update said metadata to drive their cluster membership algorithms.

Multiple instances of the described system may be implemented in parallel. Specifically, a single membership controlling component 130 in a storage system 110 may include one or more copies of cluster membership metadata 141, each instance of that metadata controlling access to multiple disjointed sets of storage volumes 111-113, and accessed by multiple sets of clustered host nodes 121-124.

Figure 2:
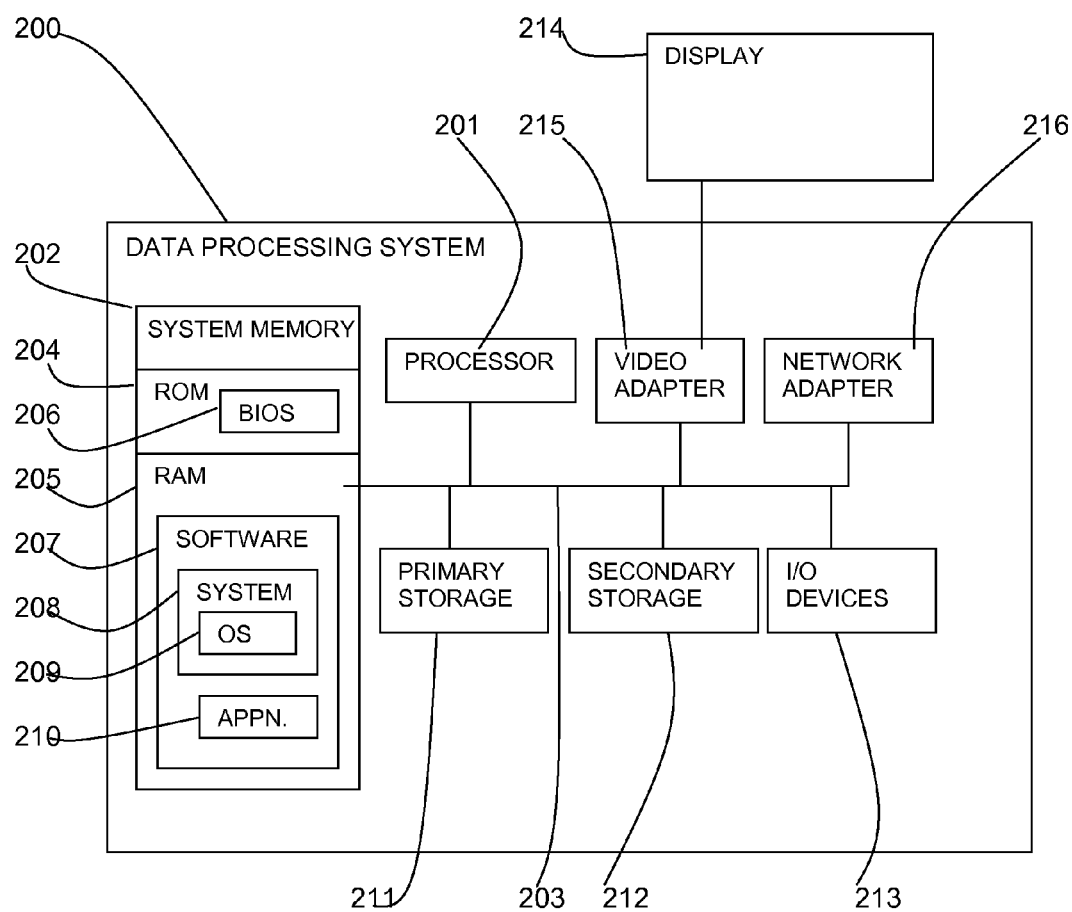
FIG. 2 is a block diagram of a computer system.

Referring to FIG. 2, an exemplary system for implementing embodiments includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
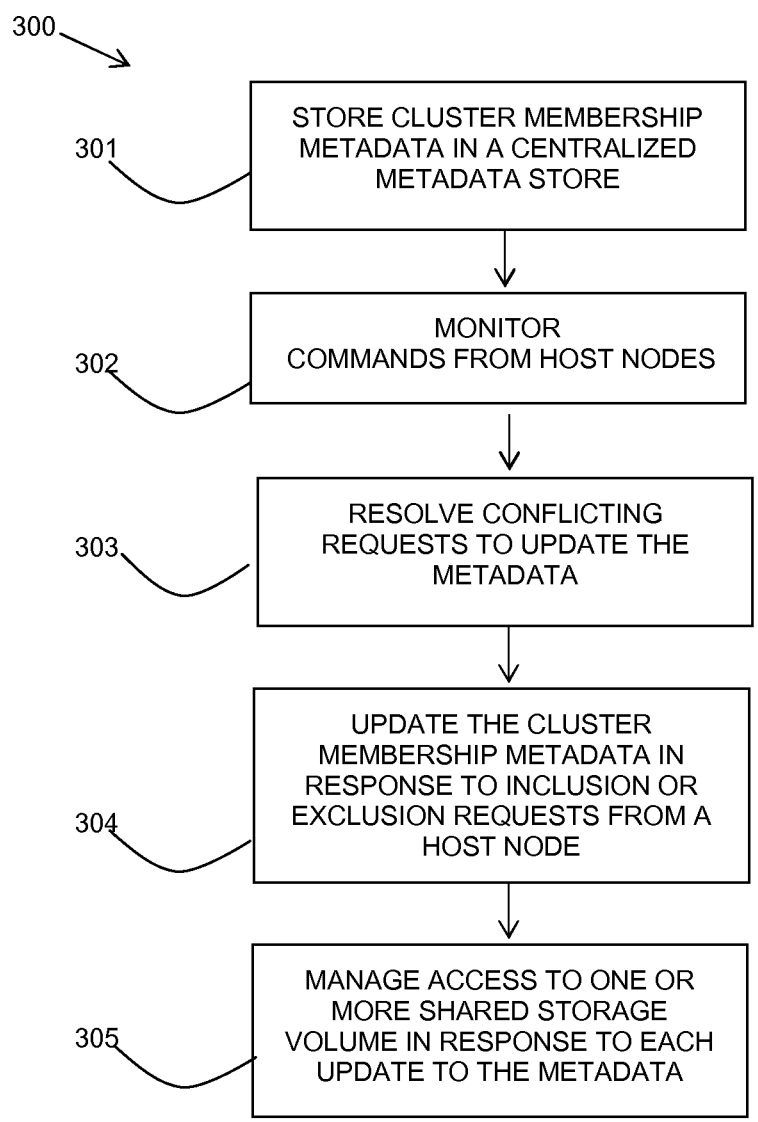
FIG. 3 is a flow diagram of an embodiment of a method.

Referring to FIG. 3, a flow diagram 300 shows an embodiment of the described method of membership control in a storage system having one or more storage volume accessed by multiple host nodes defined in one or more clusters.

The method may store 301 cluster membership metadata in a centralized metadata store independent from shared storage volumes. The cluster membership metadata may list host nodes which are current members of a cluster which is able to access defined shared storage volumes in the storage system.

The method may monitor 302 commands from the host nodes. The method may resolve 303 conflicting requests to update the metadata. As a command is received it needs to be checked to see if it conflicts with previous messages. For example, if an earlier message caused a node to be expelled, any requests it subsequently sends will be designated as conflicting, and be rejected before being allowed to update the meta-data.

The method may update 303 the cluster membership data in response to an inclusion (add member) or exclusion (expel member) requests from a host node.

The method may manage access 304 to one or more of the shared storage volumes in response to each inclusion or exclusion update to the metadata.

Figure 4:
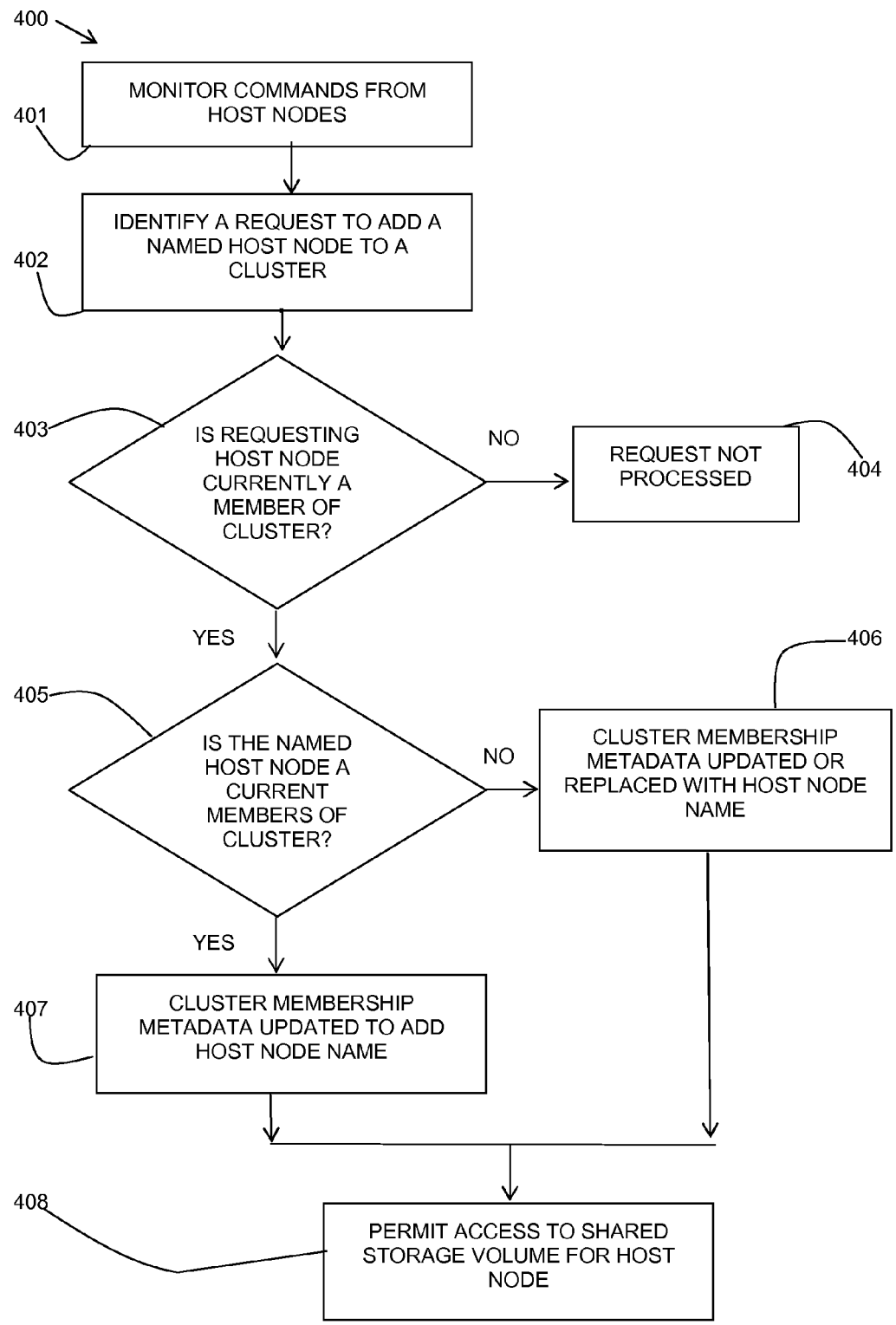
FIG. 4 is a flow diagram of an embodiment of adding a member host node to a cluster.

Referring to FIG. 4, a flow diagram shows an embodiment of an aspect of the described method of adding a member host node to a cluster.

The method may monitor 401 commands from host nodes and may identify 402 a request to add a named host nodes to a cluster which has access to one or more shared storage volumes.

In one embodiment, a host node may be added to a cluster by an existing node. It may be determined 403 if the requesting host node is currently a member of the relevant cluster. If it is not a current member, the request may not be processed 404. If it is a current member, it may then be determined 405 if the one or more named host nodes to be added are current members of the relevant cluster.

In an alternative embodiment, a host node may add itself to the cluster and steps 403/404 may be skipped. The host node has responsibility for ensuring it does this only when it is in an idle state, and when it has also contacted other members of the current cluster and is ready to act in unison with the rest of the cluster as described in the current cluster membership list.

If the named host node is a current member of the relevant cluster, the cluster membership metadata may be updated or replaced 406 with the host node name. If the named host node is not a current member of the relevant cluster, the cluster membership metadata may be updated 407 to add the host node name.

In response to the update of the metadata, the host node may then be permitted 408 to access the shared storage volumes via identified host ports which are known to be associated with the host nodes of the cluster.

Figure 5:
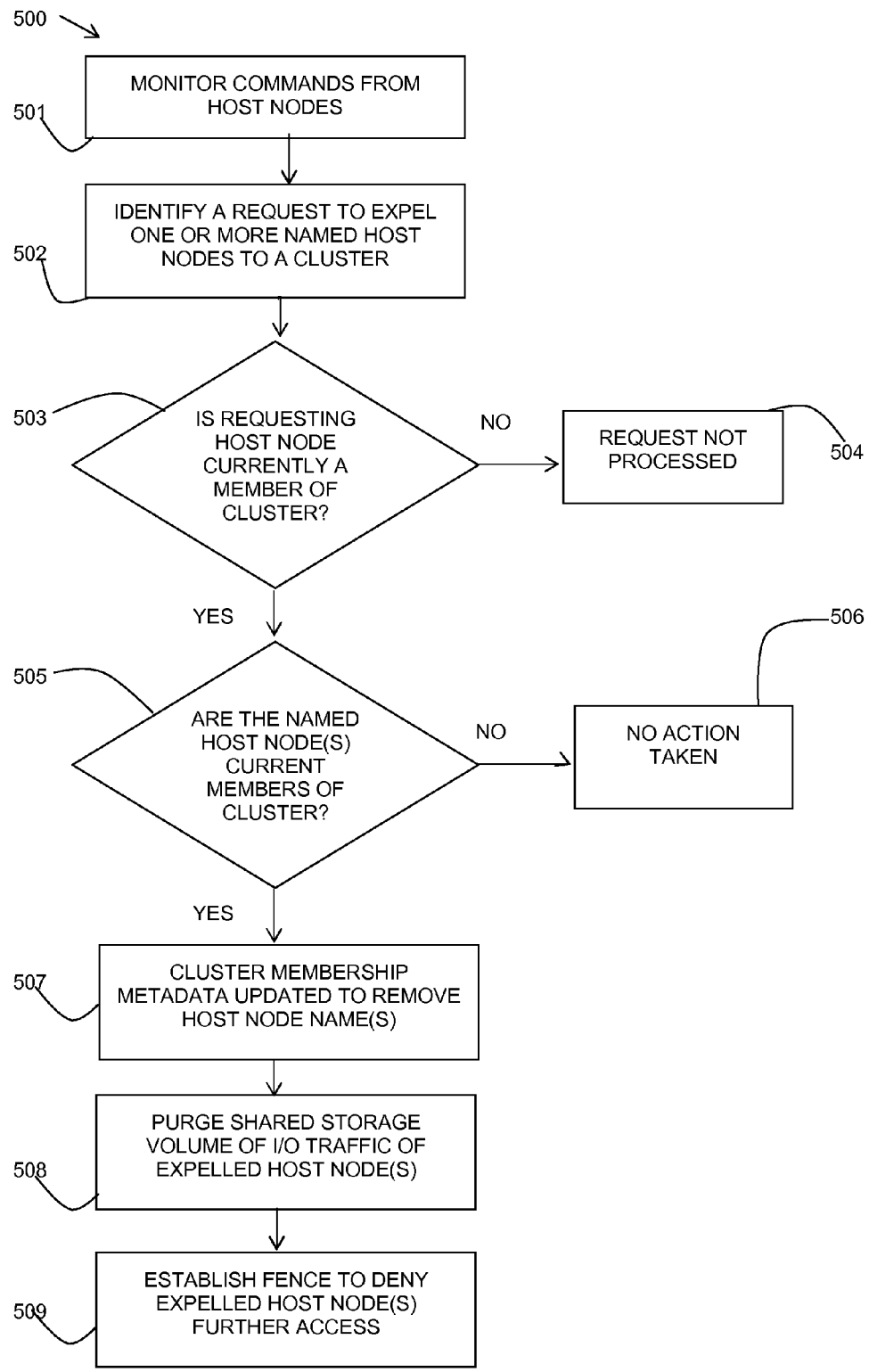
FIG. 5 is a flow diagram of an embodiment of expelling a member host node from a cluster.

Referring to FIG. 5, a flow diagram shows an embodiment of an aspect of the described method of expelling a member host node from a cluster.

The method may monitor 501 commands from host nodes and may identify 502 a request to expel one or more named host nodes from a cluster which has access to one or more shared storage volumes.

It may be determined 503 if the requesting host node is currently a member of the relevant cluster. If it is not a current member, the request may not be processed 504. If it is a current member, it may then be determined 505 if the one or more named host nodes to be expelled are current members of the relevant cluster. If the one or more named host nodes are not current members of the relevant cluster, no action need be taken 506.

If the one or more named host nodes are members of the relevant cluster, they are removed 507 from the cluster in the stored cluster membership metadata.

In addition, in response to the update of the metadata, the method may purge 508 the I/O traffic on the shared storage volumes and may establish 509 a fence so that the expelled host nodes are denied future access without interlocking again with the rest of the cluster.

The access management component examines all I/O on ingress to the storage system, and based on the host port on which the I/O arrives, combined with the logical unit to which that I/O is addressed, decides whether the host to which that host port is configured is part of the current nodes that are permitted access, or whether conversely that host has been fenced out.

If the host is fenced then the I/O is rejected and returned with error to the issuing host and no further processing is performed.

If the host is not fenced, the I/O is allowed in, and a record that that I/O is in progress is created. That record is maintained until the I/O completes.

To purge I/O, the records of all I/Os that were active for the expelled host are identified, and either aborted immediately to prevent future activity, or if they are in the middle of some critical region that cannot be aborted the purge process waits for that critical region to end. Once all recorded I/Os are known to be complete, the purge process is done.

An example implementation may be provided with the membership control provided by a Command-Line Interface (CLI) in an IBM SAN (Storage Area Network) Volume Controller (SVC) (IBM is a trade mark of International Business Machines Corporation). An SVC is a block storage virtualization appliance that implements an indirection, or "virtualization", layer in a Fibre Channel storage area network (FC SAN).

It is also possible to leverage the described method and system in storage systems which can contain multiple storage volumes, where each storage volume has its own implementation of the function interface. In this case the controlling system will still need to iterate to invoke the function on each of the sub-component systems.

The function interface provides for a single invocation to provide the fencing function across all volumes in a coherent way.

Optionally, the function interface can be used to provide a quorum tie-break function, for environments where that is needed Certain embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

The embodiments may take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for controlling access to a shared storage system wherein the shared storage system is in communication with at least one cluster of host nodes, comprising:
   storing cluster membership metadata in a metadata store independent from the shared storage system for the at least one cluster and a membership controlling component in a storage controller mediating access to the shared storage system;
   updating the cluster membership metadata in response to an inclusion or exclusion request from a requesting host node comprising one of the host nodes identifying at least one host node to include or exclude from a cluster, wherein the shared storage system includes the storage controller and at least one storage volume;
   managing, by the membership controlling component, access to at least one storage volume in the shared storage system in response to the updating of the cluster membership metadata for the inclusion or exclusion request;
   resolving, by a resolution component, a conflict of the inclusion or exclusion request to the cluster membership metadata with previous messages using a quorum tie-breaking function; and
   rejecting the inclusion or exclusion request in response to determining that the inclusion or exclusion request conflicts with the previous messages.

2. The method of claim 1, wherein the managing the access to the at least one storage volume in the shared storage system in response to the inclusion request further comprises:
   determining whether the requesting host node is a member of the cluster to which the inclusion request is directed;
   determining whether the at least one identified host node is a member of the cluster to which the inclusion request is directed; and
   permitting the at least one identified host node to access the at least one storage volume shared by the cluster in response to determining that the requesting host node and the at least one identified host node are members of the cluster to which the inclusion request is directed.

3. The method of claim 2, further comprising:
   updating the cluster membership metadata to add a name of each host node of the at least one identified host node that is not indicated as a member of the cluster to which the inclusion request is directed.

4. The method of claim 1, wherein the managing access to the at least one storage volume in the shared storage system in response to the exclusion request to exclude the at least one identified host node comprises:
   purging shared storage volumes of Input/Output traffic of the at least one identified host node indicated in the exclusion request.

5. The method of claim 1, wherein the managing access to the at least one storage volume in the shared storage system in response to the exclusion request to exclude the at least one identified host node comprises:
   determining whether the requesting host node is a member of the cluster to which the exclusion request is directed;
   determining whether the at least one identified host node is a member of the cluster to which the exclusion request is directed; and
   updating the cluster membership metadata to remove the at least one identified host node.

6. The method of claim 1, wherein the managing access to the at least one storage volume in the shared storage system in response to the exclusion request includes:
   establishing a fence to deny the identified at least one host node indicated in the exclusion request further access to the shared storage system.

7. The method of claim 1, further comprising:
   maintaining multiple instances of the cluster membership metadata to manage access of the at least one storage volume by the host nodes in the cluster.

8. A system for controlling access to a shared storage system wherein the shared storage system is in communication with a cluster of host nodes, comprising:

a storage controller including a processor and a memory device including a membership controlling component, access management component, and resolution component executed by the processor to, mediate access to the shared storage system;

a metadata store to store cluster membership metadata independent from the shared storage system and the membership controlling component, wherein the shared storage system includes the storage controller and storage volume;

wherein the membership controlling component updates the cluster membership metadata in response to an inclusion or exclusion request from a requesting host node comprising one of the host nodes identifying at least one host node to include or exclude from a cluster;

wherein the access management component manages access to at least one storage volume in the shared storage system in response to the updating of the cluster membership metadata for the inclusion or exclusion request; and wherein the resolution component resolves a conflict of the inclusion or exclusion request to the cluster membership metadata with previous messages using a quorum tie-breaking function; and wherein the inclusion or exclusion request is in response to determining that the inclusion or exclusion request conflicts with the previous messages.

9. The system of claim 8, wherein the managing the access to the at least one storage volume in the shared storage system in response to the inclusion request further comprises:

determining whether the requesting host node is a member of the cluster to which the inclusion request is directed;

determining whether the at least one identified host node is a member of the cluster to which the inclusion request is directed; and permitting the at least one identified host node to access the at least one storage volume shared by the cluster in response to determining that the requesting host node and the at least one identified host node are members of the cluster to which the inclusion request is directed.

10. The system of claim 9, wherein the membership controlling component further performs:

updating the cluster membership metadata to add a name of each host node of the at least one identified host node that is not indicated as a member of the cluster to which the inclusion request is directed.

11. The system of claim 8, wherein the managing access to the at least one storage volume in the shared storage system in response to the exclusion request to exclude the at least one identified host node comprises:

purging shared storage volumes of Input/Output traffic of the at least one identified host node indicated in the exclusion request.

12. The system of claim 8, wherein the managing access to the at least one storage volume in the shared storage system in response to the exclusion request to exclude the at least one identified host node comprises:

determining whether the requesting host node is a member of the cluster to which the exclusion request is directed;

determining whether the at least one identified host node is a member of the cluster to which the exclusion request is directed; and updating the cluster membership metadata to remove the at least one identified host node.

13. The system of claim 8, wherein the managing access to the at least one storage volume in the shared storage system in response to the exclusion request includes:

establishing a fence to deny the identified at least one host node indicated in the exclusion request further access to the shared storage system.

14. The system of claim 8, wherein the membership controlling component further performs:

maintaining multiple instances of the cluster membership metadata to manage access of the at least one storage volume by the host nodes in the cluster.

15. A computer program product comprising a non-transitory computer readable storage device having code executed by a processor for controlling access to a shared storage system wherein the shared storage system is in communication with at least one cluster of host nodes and a storage controller for performing operations, the operations comprising:

storing cluster membership metadata in a storage independent from the shared storage system for the at least one cluster and a membership controlling component in a storage controller mediating access to the shared storage system, wherein the shared storage system includes the storage controller and at least one storage volume;

updating the cluster membership metadata in response to an inclusion or exclusion request from a requesting host node comprising one of the host nodes identifying at least one host node to include or exclude from a cluster;

managing, by the membership controlling component, access to at least one storage volume in the shared storage system in response to the updating of the cluster membership metadata for the inclusion or exclusion request;

resolving, by a resolution component, a conflict of the inclusion or exclusion request to the cluster membership metadata with previous messages using a quorum tie-breaking function; and rejecting the inclusion or exclusion request in response to determining that the inclusion or exclusion request conflicts with the previous messages.

16. The computer program product of claim 15, wherein the managing the access to the at least one storage volume in the shared storage system in response to the inclusion request further comprises:

determining whether the requesting host node is a member of the cluster to which the inclusion request is directed;

determining whether the at least one identified host node is a member of the cluster to which the inclusion request is directed; and permitting the at least one identified host node to access the at least one storage volume shared by the cluster in response to determining that the requesting host node and the at least one identified host node are members of the cluster to which the inclusion request is directed.

17. The computer program product of claim 16, wherein the operations further comprise:

updating the cluster membership metadata to add a name of each host node of the at least one identified host node that is not indicated as a member of the cluster to which the inclusion request is directed.

18. The computer program product of claim 15, wherein the managing access to the at least one storage volume in the shared storage system in response to the exclusion request to exclude the at least one identified host node comprises:

purging shared storage volumes of Input/Output traffic of the at least one identified host node indicated in the exclusion request.

19. The computer program product of claim 15, wherein the managing access to the at least one storage volume in the shared storage system in response to the exclusion request to exclude the at least one identified host node comprises:
- determining whether the requesting host node is a member of the cluster to which the exclusion request is directed;
- determining whether the at least one identified host node is a member of the cluster to which the exclusion request is directed; and
- updating the cluster membership metadata to remove the at least one identified host node.

20. The computer program product of claim 15, wherein the managing access to the at least one storage volume in the shared storage system in response to the exclusion request includes:
- establishing a fence to deny the identified at least one host node indicated in the exclusion request further access to the shared storage system.

21. The computer program product of claim 15, wherein the operations further comprise:
- maintaining multiple instances of the cluster membership metadata to manage access of the at least one storage volume by the host nodes in the cluster.

* * * * *